United States Patent [19]

Speas

[11] 4,209,104
[45] Jun. 24, 1980

[54] DRUM ASSEMBLIES WITH PREFORMED INSERTS

[75] Inventor: Charles A. Speas, Towson, Md.
[73] Assignee: Hedwin Corporation, Baltimore, Md.
[21] Appl. No.: 885,363
[22] Filed: Mar. 13, 1978

Related U.S. Application Data

[62] Division of Ser. No. 787,153, Apr. 13, 1977.

[51] Int. Cl.² .......................... B65D 7/42; B65D 7/02
[52] U.S. Cl. ........................................ 220/71; 220/73; 220/5 R
[58] Field of Search ....................... 220/71, 72, 73, 74, 220/5 R, 85 K, 89 B, 94 A, 70

[56] References Cited

U.S. PATENT DOCUMENTS

| | | | |
|---|---|---|---|
| 3,294,271 | 12/1966 | Armbruster | 220/71 X |
| 3,393,821 | 7/1968 | Verlinden | 220/5 R |
| 3,960,474 | 6/1976 | Kader | 425/525 X |
| 4,022,345 | 5/1977 | Butz | 220/73 X |
| 4,024,979 | 5/1977 | Craig et al. | 220/85 K X |
| 4,140,236 | 2/1979 | Uhlig et al. | 220/71 |

FOREIGN PATENT DOCUMENTS

| | | |
|---|---|---|
| 1857242 | 5/1962 | Fed. Rep. of Germany . |
| 1865076 | 9/1962 | Fed. Rep. of Germany . |
| 1880276 | 7/1963 | Fed. Rep. of Germany . |
| 1908556 | 1/1965 | Fed. Rep. of Germany . |

*Primary Examiner*—Steven M. Pollard
*Attorney, Agent, or Firm*—Raphael Semmes

[57] ABSTRACT

A plastic drum assembly includes a preformed insert fused to at least a portion of the corner of the drum. In order to facilitate lifting and handling the drum, the insert is formed with a pair of indentations on opposite sides of a ridge. The method involves placing the preformed plastic insert across at least a portion of a corner of a mold cavity and blow molding the drum in the cavity to form the drum and fuse the drum corner to the insert. The disclosure also is concerned with methods for forming indentations in a blow molded plastic drum and with a method of reinforcing the corner of a blow molded drum.

8 Claims, 40 Drawing Figures

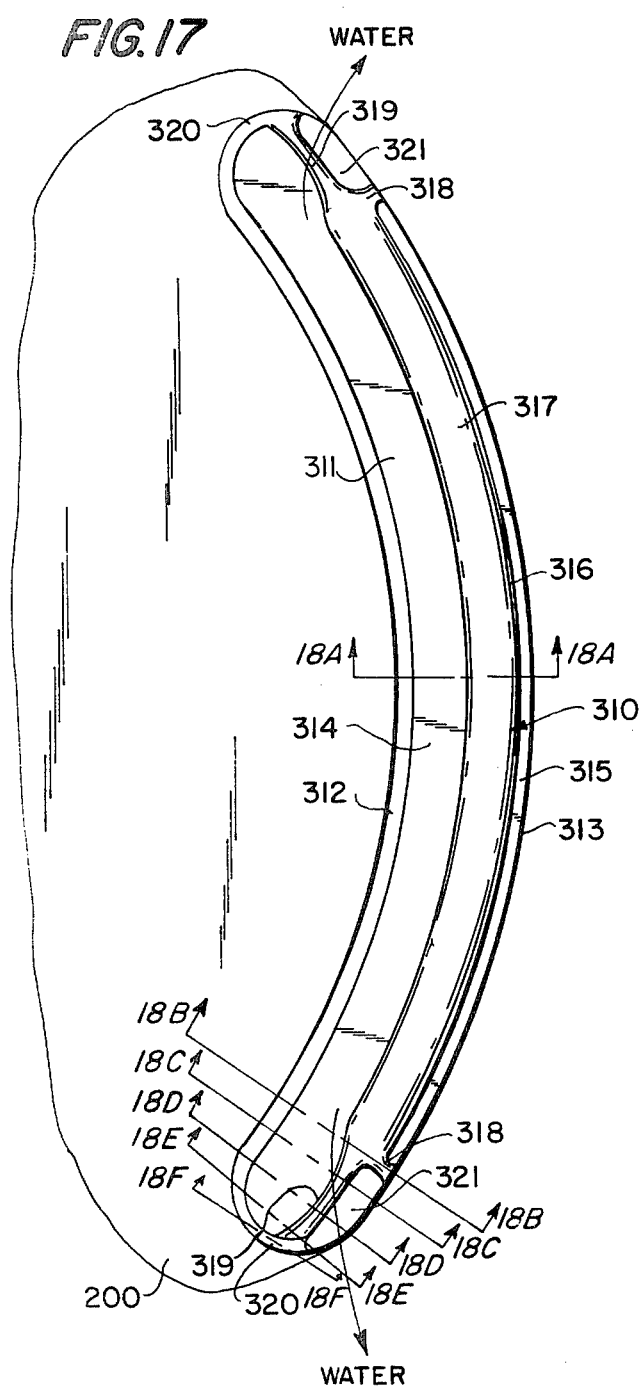

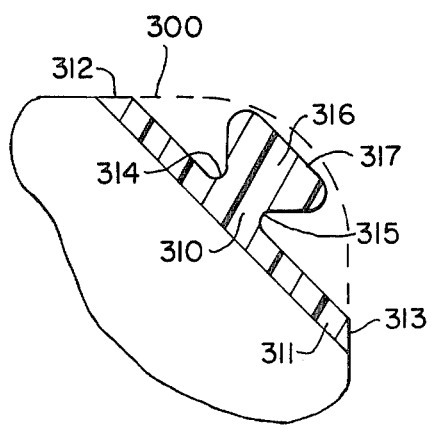
FIG. 18A
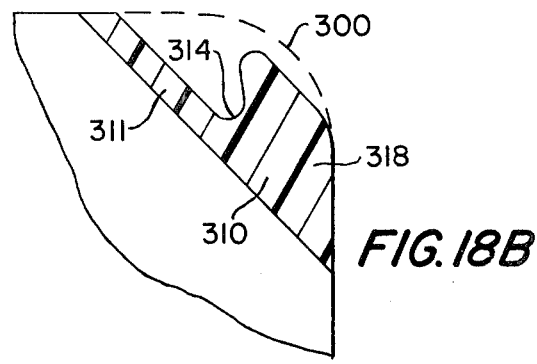
FIG. 18B
FIG. 18C
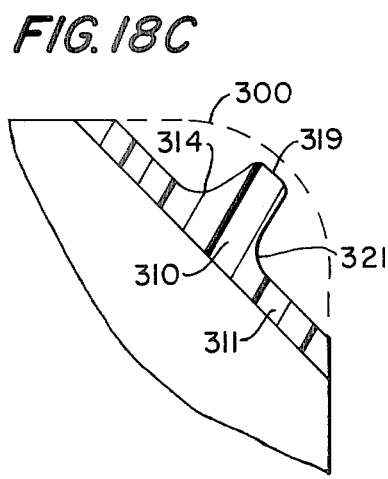
FIG. 18D
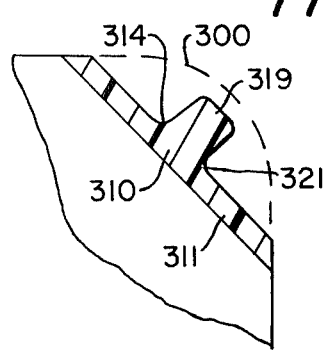
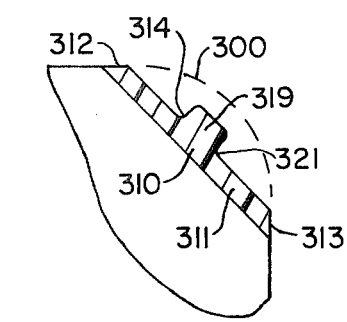
FIG. 18E
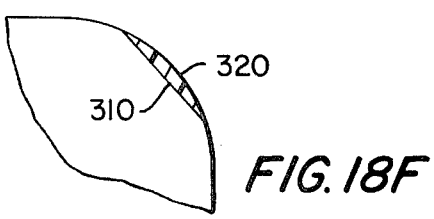
FIG. 18F

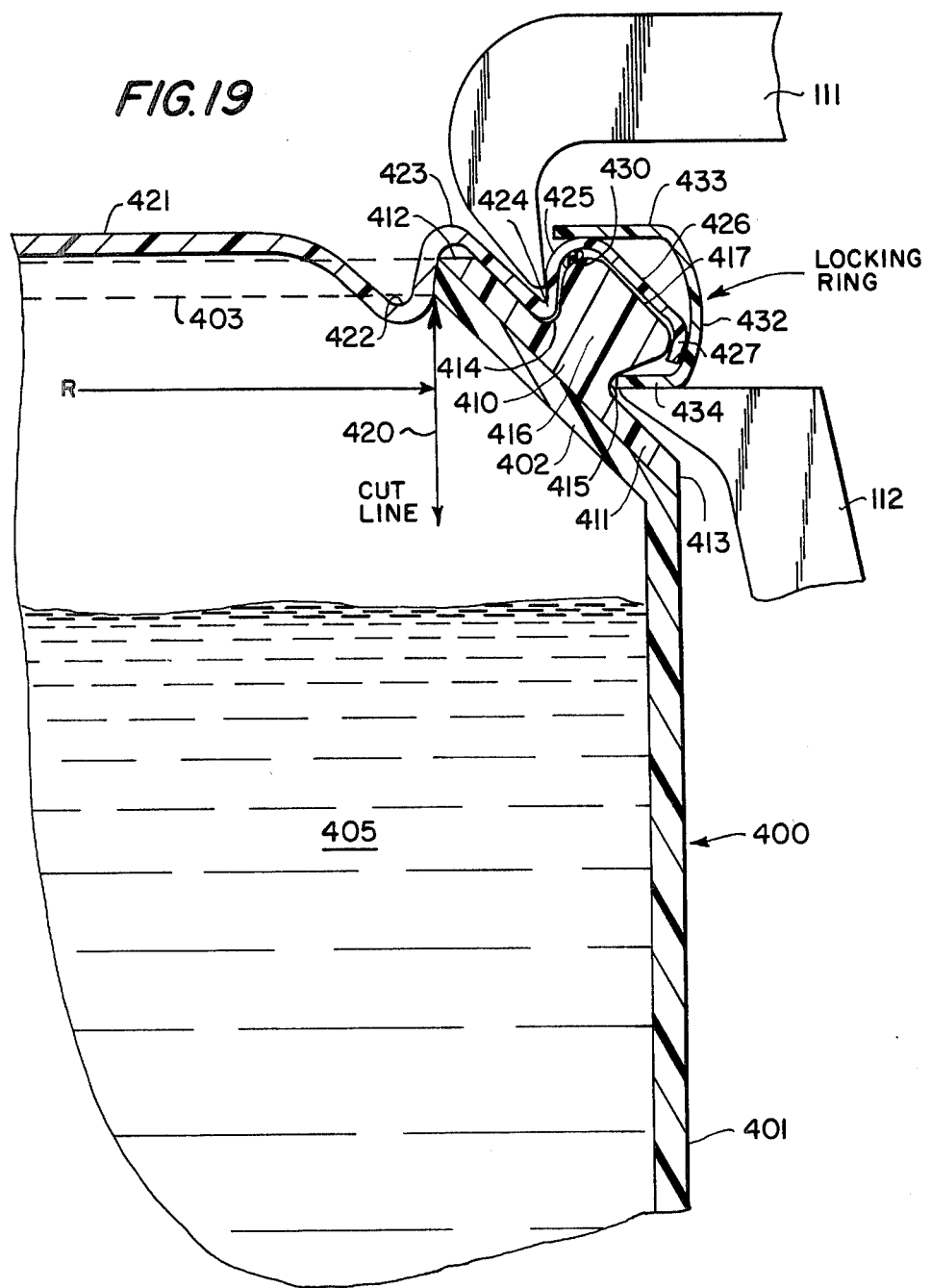

100 PSI BLOW PRESSURE

DRUM ASSEMBLIES WITH PREFORMED INSERTS

This is a division of application Ser. No. 787,153 filed Apr. 13, 1977.

BACKGROUND OF THE INVENTION

This invention relates to plastic drums and drum assemblies, preformed plastic inserts for use in plastic drum assemblies, and methods of forming plastic drums and plastic drum assemblies.

Steel and fiber drums have long been utilized for the shipment and storage of liquid, paste, powder, and solid products. A fundamental requirement of all such drums is the need for safe and convenient handling. For this purpose, a number of specialized devices have been developed including fork-lift trucks which can grasp the drum around its center girth or by other means. One such means which is widely used is the "parrot's beak" mechanism; this device includes a pair of jaws which engage a structure on the steel lid and locking band of such drums. More recently, plastic drums blow molded from high density polyethylene have become popular. These drums have rounded corners at the ends, and such corners and the slick surface of the polyethylene plastic make the handling of these drums very difficult. It is not feasible to apply the "parrot's beak" jaws to the top rim of such a plastic drum due to the absence of a suitable structure to be engaged by the jaws of the "parrot's beak." This has led to a number of attempts to modify the plastic drum construction to accommodate the "parrot's beak" jaws. A number of these prior art expedients will be discussed more fully hereinafter with reference to the drawings. It will be noted here, however, that the most promising of the prior art expedients involves the provision of a preformed plastic insert fused to the corner of the drum with the insert surmounted on the normal drum structure. This is accomplished by altering the conventional mold cavity used for blow molding the plastic drum; a groove is cut through the corner of the mold cavity wall for holding the preformed plastic insert. However, this procedure unduly complicates the design, construction and operation of the metal mold.

SUMMARY OF THE INVENTION

It is therefore an object of the present invention to provide improved plastic drum assemblies which overcome the aforesaid drawbacks. In particular, it is an object of the present invention to provide a method of forming a plastic drum assembly fused to a preformed plastic insert to facilitate lifting the drum which does not require modification of the conventional plastic drum mold.

Further objects of the invention include the provision of preformed plastic inserts particularly suitable for these ends, an improved method of forming the plastic drum assemblies, an improved method of reinforcing the corners of blow molded plastic drums, and improved methods of forming indentations in the walls of blow molded plastic drums.

Briefly, the invention contemplates the provision of a blow molded plastic drum assembly, at least a portion of the upper corner of which is modified and joined to a preformed plastic insert having a pair of indentations on opposite sides of a ridge to facilitate lifting the drum assembly. This preformed plastic insert includes a base having opposed edge surfaces which are flush with the surface of the upper end of the drum and the cylindrical surface of the side wall of the drum. One side of the base is fused to the modified corner portion of the blow molded drum, while the aforementioned ridge extends outwardly from the opposite side of the base. The crown of the ridge may be convex, concave, or flat. Because of the requirements of the method, the insert is so dimensioned that it does not extend upwardly or outwardly beyond the usual contours of the drum corner. In one embodiment, the insert is formed so as to drain any water which might collect in the upper indentation.

The method of forming the drum assembly involves placing the preformed insert within an unmodified conventional mold for blow molding plastic drums with the side edges of the base engaged respectively with an end wall and a side wall of the mold cavity completely to close off at least a portion of the corner of the mold cavity. The crown of the ridge of the insert may engage or, in other embodiments, may extend just short of the corner of the mold cavity. After the insert is positioned within the mold cavity, a plastic parison is blow molded into the mold cavity to form the drum assembly with the modified corner structure fused to the base of the insert. In order to enhance the fit of the insert with the mold cavity and provide heat bonding between the insert and the blow molded material, the insert is preheated throughout the part before it is placed in the mold cavity. In an embodiment of the method, support members may be engaged in the indentations of the plastic insert to prevent the plastic insert from collapsing during the blow molding process.

It also is contemplated that a blow molded drum be reinforced by placing a preformed reinforcing member in the corner of the mold cavity to become fused to the corner of the blow molded drum during the blow molding process. In another aspect of the invention, a blow molded drum is provided with one or more indentations by omitting the plastic insert and leaving one, or both, of the support members in the mold cavity.

These and other objects, features, and advantages of the invention will become more readily apparent from consideration of the following detailed description of preferred embodiments of the invention when taken in conjunction with the accompanying drawings.

BRIEF DESCRIPTION OF THE DRAWINGS

FIG. 16 is a plan view of a second preferred embodiment of insert of the invention;

FIG. 17 is a partial plan view of a drum assembly of the invention employing the insert of FIG. 16;

FIG. 18A is a schematic section view on line 18A—18A of FIG. 17;

FIG. 18B is a schematic section view on line 18B—18B of FIG. 17;

FIG. 18C is a schematic section view on line 18C—18C of FIG. 17:

FIG. 18D is a schematic section view on line 18D—18D of FIG. 17;

FIG. 18E is a schematic section view on line 18E—18E of FIG. 17;

FIG. 18F is a schematic section view on line 18F—18F of FIG. 17;

FIG. 19 is a partial schematic section view of a further embodiment of a drum assembly of the invention;

DETAILED DESCRIPTION

Figure 1:
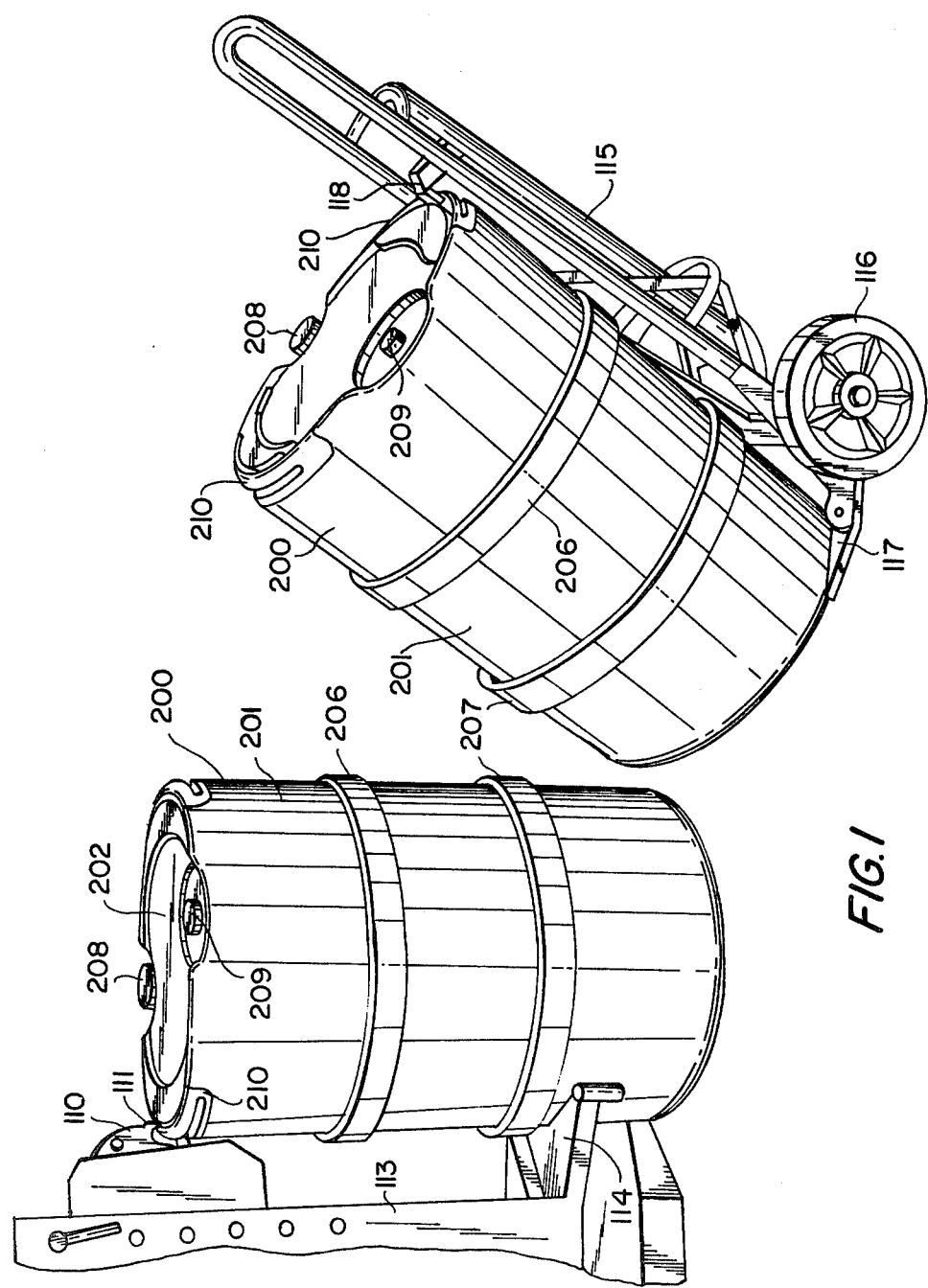
FIG. 1 is a perspective view showing two drum assemblies of the invention mounted on two different types of drum handling equipment.

A pair of drum assemblies 200 of the invention are shown in FIG. 1, each being carried by a different type of drum handling apparatus. As will be explained more fully hereinafter, each drum includes a preformed plastic insert 210 having a pair of indentations on opposite sides of a corner. The drums are otherwise conventional and include a cylindrical side wall 201, an end wall 202, a pair of rolling hoops 206 and 207, and closures 208 and 209 for openings in the top end wall 202. As seen at the left side of FIG. 1, a "parrot's beak" mechanism 110 is engaged with a drum assembly 200. This mechanism includes a pair of opposed grabbing and lifting jaws which are engaged respectively, in the indentations. The "parrot's beak" mechanism is mounted on a carriage 113 from which a drum engaging leg 114 projects to engage with the side wall 201 at a point below lower rolling hoop 207. On the right-hand side of FIG. 1, another type of drum handling apparatus 115 is shown. This apparatus is mounted on a pair of wheels 116 and includes a pair of drum engaging arms 117 for engaging opposed points on the cylindrical side wall 201 of the drum assembly 200. A hook 118 extends from a point near the end of apparatus 115 to engage with the upper indentation of preformed insert 210.

Figure 2A:
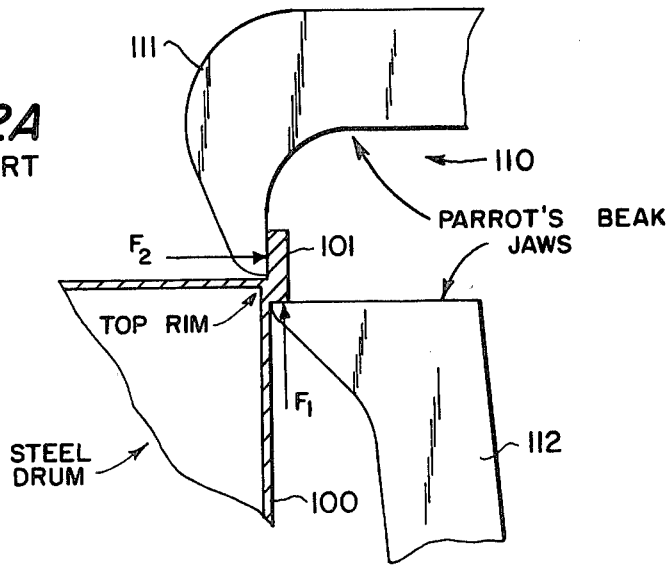
FIG. 2A is a partial schematic section view of an example of a drum of the prior art.
Figure 2B:
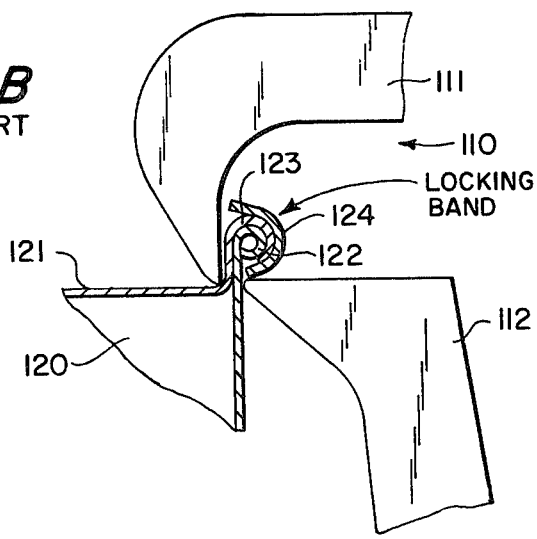
FIG. 2B is a partial schematic section view of another example of a drum of the prior art.

Before continuing with a detailed description of the embodiment of the invention as shown in FIG. 1, it will be well to review the practices of the prior art. For many years, steel and fiber drums have been used for the shipment and storage of thousands of different liquid, paste, powder, and solid products. A fundamental requirement of all such drums is the need for safe and convenient handling, such as lifting, rolling, and sliding, normally accomplished by hand or other means of grasping and transporting the drums individually or in groups. For this purpose, many special attachments have been devised for fork-lift trucks and the like for grasping the drum around its side wall or for otherwise engaging the drum. A very popular attachment is referred to in the drum handling art as a "parrot's beak" mechanism and typically includes a pair of pivoted jaws for engaging a special structure provided on the corner of the drum. In FIG. 2A, a "parrot's beak" mechanism 110 includes jaws 111 and 112 engaged with a special top rim structure 101 of a steel drum 100. In operation, bottom jaw 112 applies a vertical force $F_1$ to the under side of rim 101; and top jaw 111 applies a lateral force $F_2$ to the inside surface of rim 101. FIG. 2B illustrates the use of the "parrot's beak" jaws mechanism 110 with a steel or fiber drum 120 provided with a steel lid 121. A special rim is formed by rolling over the upper edge 122 of drum 120, by rolling the peripheral edge 123 of lid 121 over rim 122, and by applying a locking band 124 over the rolled over peripheral edge 123. This special structure is engaged by the jaws 111 and 112 as shown in FIG. 2B.

Figure 3:
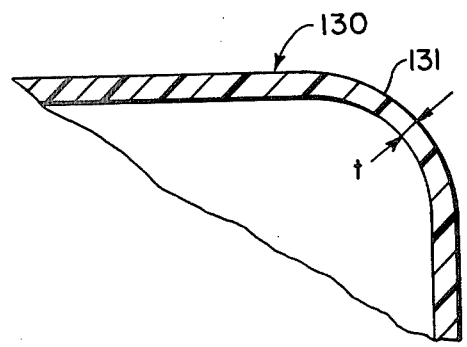
FIG. 3 is a partial section view showing the normal corner configuration of a plastic drum.
Figure 4:
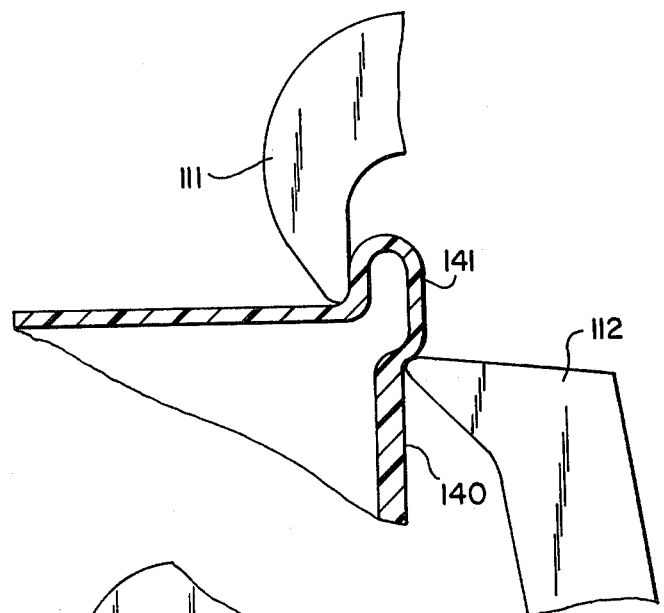
FIG. 4 is a partial schematic section view of an additional example of a drum.

Plastic drums which are blow molded from high density polyethylene are now widely used and typically are provided in the 55-gallon size. As shown in FIG. 3, such a drum 130 is provided with a rounded corner 131 at both ends. Such a smooth shape and the slick surface of the polyethylene plastic make the handling of these drums very difficult. It is not feasible to apply the "parrot's beak" jaws to a round corner such as the corner 131. Accordingly, the utility of plastic drums has been seriously limited; such drums, in their usual configuration, cannot be used by that segment of drum users who require the use of a "parrot's beak" lifting and handling device. For this reason, a number of attempts have been made to modify the plastic drum construction to accommodate the "parrot's beak" jaws. It has been suggested, for example, to blow mold the drum 140 with a special corner configuration 141. Although this corner configuration may then be engaged by the jaws 111 and 112 of the "parrot's beak" mechanism, the corner will not be strong enough to support the drum; the plastic has a lower stiffness and tensile strength than steel. There is also a tendency in a blow molded drum for the thickness t to be reduced at the corner 131 (see FIG. 3). When the corner of the drum is configured as illustrated in FIG. 4, there is an even greater tendency for the plastic at corner configuration 141 to thin out, making the corner even weaker.

Figure 5:
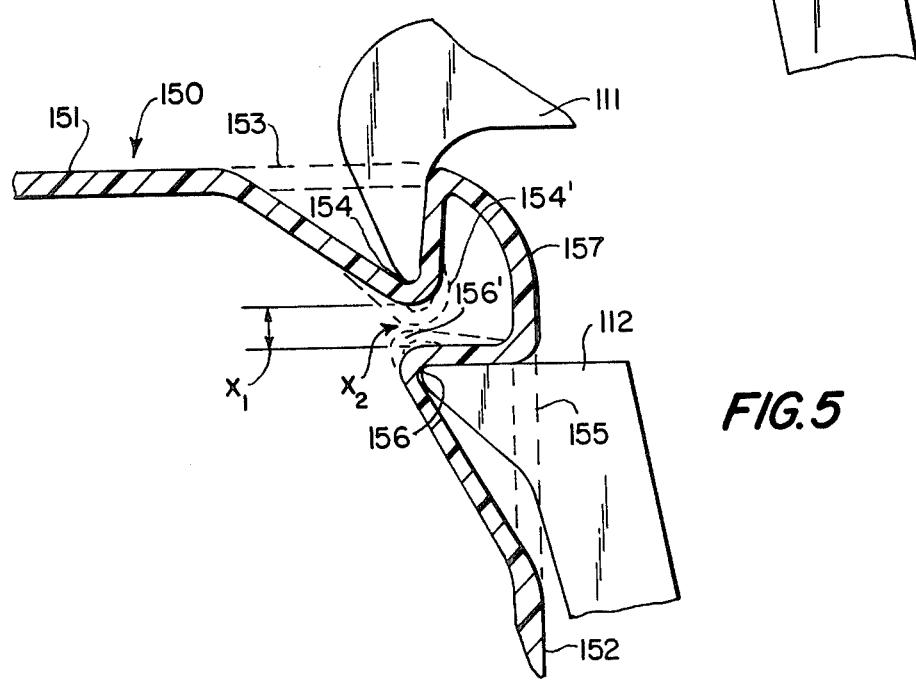
FIG. 5 is a partial schematic section view of a drum embodiment of the invention.
Figure 25A:
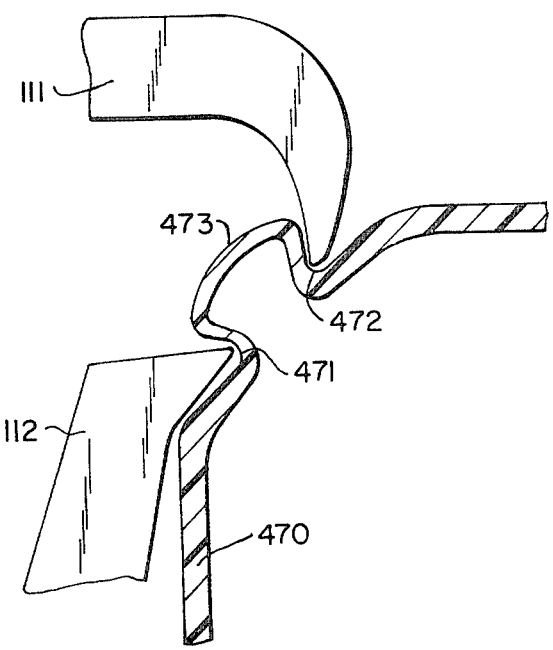
FIG. 25A is a partial schematic section view of a drum made by the method of FIG. 25.
Figure 25:
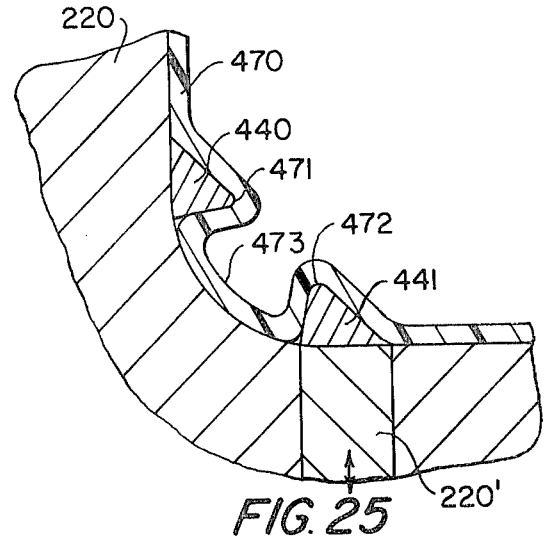
FIG. 25 is a partial schematic section view illustrating still another method of the invention.

The applicant has had some success with a blow molded drum configuration as shown in FIG. 5. Here, the drum 150 has a top wall 151 and a cylindrical side wall 152. A pair of indentations 154 and 156 are formed in the top and side walls, respectively, after the drum has been molded by applying a heated tool at the portion 153 of top wall 151 and the portion 155 of side wall 152, thus forming indentations 154 and 156. The corner configuration 157 will then be engagable by the jaws 111 and 112 of the "parrot's beak" mechanism as illustrated in FIG. 5. With this construction, it has been found that the dimension $X_1$ should be maintained at less than approximately ⅜ inch. When this dimension is used, a full drum can be lifted and handled successfully with the "parrot's beak" mechanism. When so engaged by jaws 111 and 112, the two indentations 154 and 156 are pushed toward each other to the deflected positions 154' and 156' shown by phantom line to meet at point $X_2$. If the distance $X_1$ is greater than approximately ⅜ inch, it has been found that one of the jaws 111 and 112 is liable to push through the indentation, thereby causing a leak in the drum. Although approximately ⅜ inch is the correct maximum distance for $X_1$ for 55-gallon drums with an average wall thickness of about 0.25 inch, a different maximum distance may be appropriate for drums of different size, wall thickness or loading factor. In any case, the maximum distance should be selected so that the indentations contact before development of a shearing force. It has been found that the post-forming operation done by hand is prohibitive for cost reasons. This post-forming could also be accomplished automatically by first blow molding a drum in the configuration shown in FIG. 3 and then projecting special top and side forming pieces from the walls of the mold cavity into the hot plastic before the plastic has frozen. However, the cost of modifying the mold in this way also is prohibitive. A less costly method of forming the indentations is shown in FIG. 25, which will be described more fully hereinafter.

Figure 6:
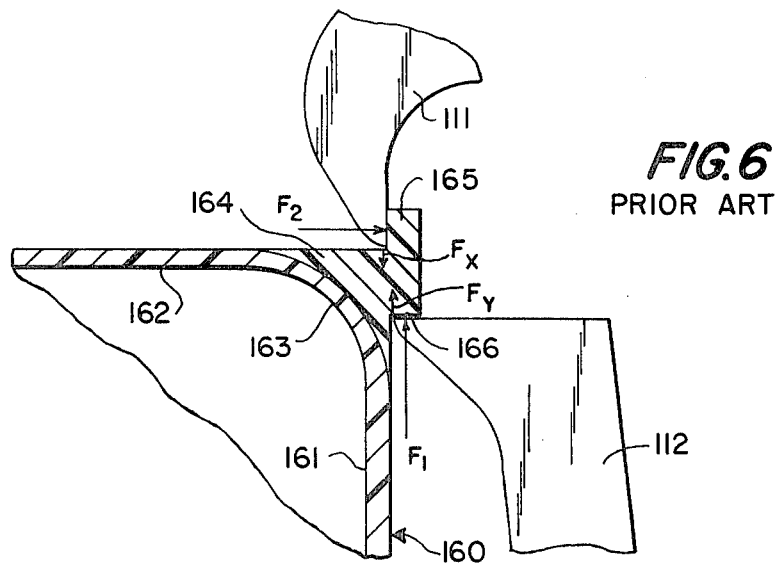
FIG. 6 is a partial schematic section view of a drum assembly of the prior art.

Another technique, suggested in the prior art, for modifying the corner of a blow molded drum is shown in FIG. 6. The drum 160 has a top wall 162 and a cylindrical side wall 161 connected by the usual rounded corner 163. A special preformed polyethylene insert 164 is surmounted on and heat sealed or cemented to corner 163. Insert 164 includes an upstanding rim 165 and a shoulder 166 which are engagable, respectively, by the jaws 111 and 112 of the "parrot's beak" mechanism. As before, jaw 111 engages the inside surface of rim 165 with a lateral force $F_2$, while jaw 112 engages the shoulder 166 with a vertical force $F_1$. Gripping force vectors $F_X$ and $F_Y$ are generated, as shown in the figure.

Figure 7:
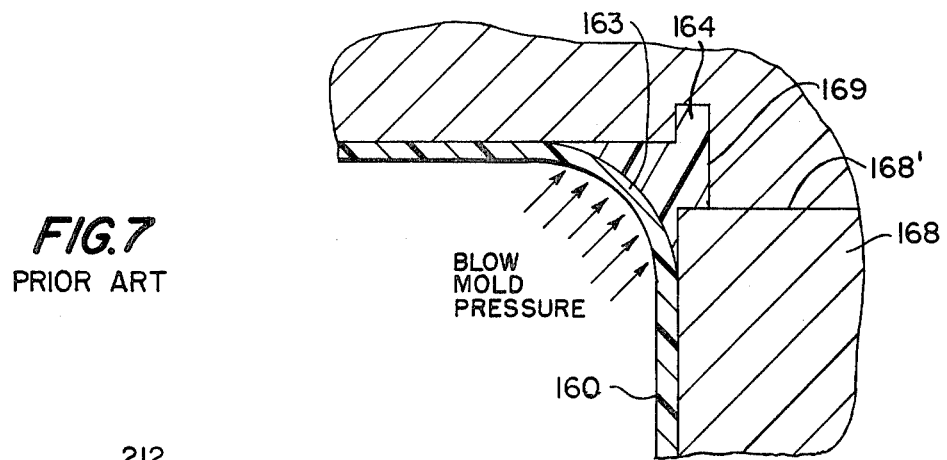
FIG. 7 is a partial schematic section view showing a step in the method of making the prior art embodiment of FIG. 6.

The preformed insert 164 of FIG. 6 may be attached to a blow molded drum in the manner shown in FIG. 7 which illustrates the technique of heat sealing the insert in the mold. It is necessary to modify the mold 168 by cutting a recess 169 through the corner of the mold to receive the preformed insert with its surface to be joined to the blow molded drum conforming exactly with the normal corner configuration of the drum. Polyethylene is then blow molded into the mold cavity and the blow molding pressure pushes the hot polyethylene against the exposed surface of insert 164. This causes the blow molded corner of drum 160 to become fused to the exposed surface of insert 164, which surface will have been preheated. The result is a heat sealed insert 164 bonded to the corner 163 of a blow molded drum 160. In order to make it possible to place insert 164 in recess 169 and to remove the drum and fused-on insert from the mold upon completion of the blow molding cycle, the mold must be separated along the line of separation 168'. This technique has the obvious drawback of complicating the design, construction, and operation of the metal mold.

Figure 8:
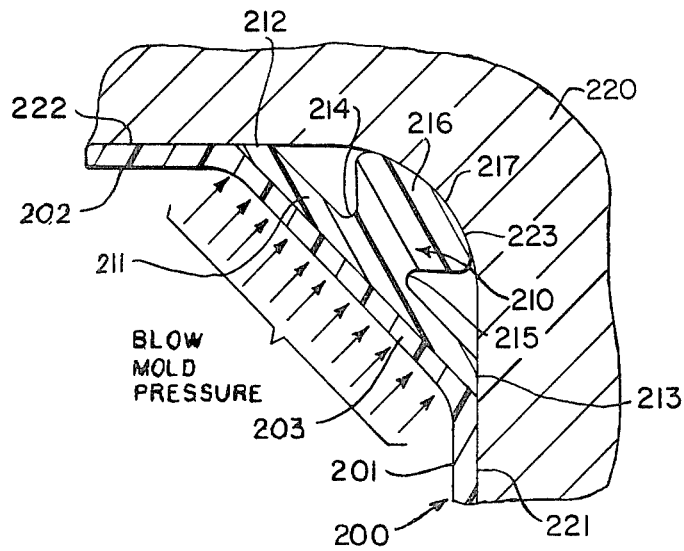
FIG. 8 is a partial schematic section view showing a step in a preferred method of making a drum assembly of the invention.
Figure 20:
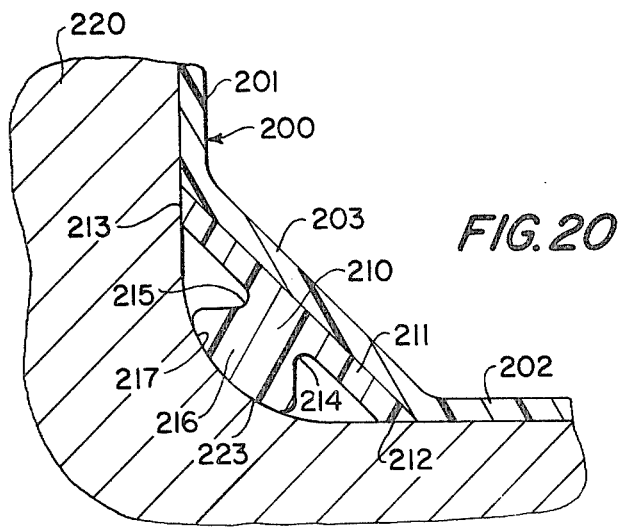
FIG. 20 is a partial schematic section view showing a step in a preferred method of the invention.

This problem is avoided by the present invention, an embodiment of which is specifically illustrated in FIG. 8. Here, the mold 220 is the conventional mold used for blow molding plastic drums having the usual curved corner configuration as illustrated in FIG. 3. The mold 220 has a cylindrical side wall 221 and a generally flat end wall 222, these being connected by a curved corner 223. A special preformed polyethylene insert 210 is placed in the mold cavity to close off the portion of the mold cavity containing the corner 223. Insert 210 includes a generally flat base 211 having flat side edges 212 and 213 which are angled so that they may be positioned flush with the top wall 222 and side wall 221, respectively, of the mold. Insert 210 is formed with a pair of indentations 214 and 215 on opposite sides of a protruding ridge 216. In the embodiment shown in FIG. 8, the crown 217 of ridge 216 is convex and has the same radius of curvature as the corner 223 of the mold and, in fact, is engaged with this corner. As will be explained hereinafter, it is also possible to use inserts, the ridge of which is spaced from this corner. Hot polyethylene is introduced into the mold and blow molded under blow molding pressure to form a drum 200 with a cylindrical side wall 201 formed by side wall 221 of the mold and a top wall 202 formed by top wall 222 of the mold. The corner 203 of the drum is deformed by the base 211 of insert 210 and becomes heat sealed to the insert along the interface formed on the exposed side of base 211. As will be explained more fully hereinafter, preferred embodiments of insert 210 extend only partially about the periphery of the drum and, therefore, close off only a portion of the corner 223 of the mold. In that case it is necessary that the entire periphery of the insert, including edges 212, 213, and corresponding end edges, be engaged snugly with the walls of the mold cavity to prevent hot polyethylene from leaking into the corner. As will be evident from FIG. 8, the inclusion of the preformed injection molded insert 210 in contact with the mold, and the closing off of a corner of the mold, eliminates any requirement for any major modifications to the mold itself. When, however, the insert is placed in the top of the mold, as shown in FIG. 8, it is necessary to provide suitable holding devices to retain the insert in position. This can be avoided by molding the drum upside down, as is shown in FIG. 20. Gravity will then hold the insert in place. Thus, drums can be modified in accordance with the present invention without costly modification or alteration of the standard drum mold merely by placing a perfumed injection molded insert into the appropriate corner of the mold. After this, the blow molding process proceeds in the usual manner.

Figure 9:
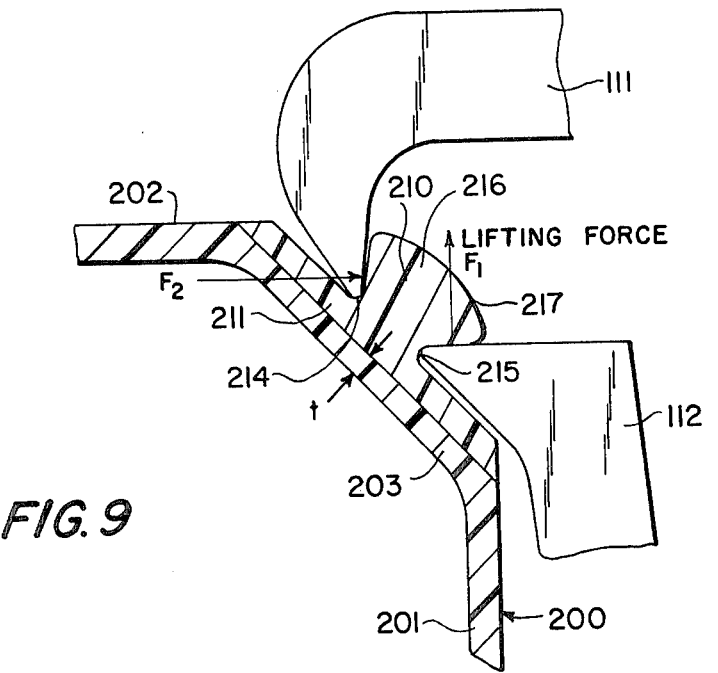
FIG. 9 is a partial schematic section view of a preferred embodiment of a drum assembly of the invention engaged by a "parrot's beak" mechanism.

A drum assembly 200 formed in accordance with the method shown in FIG. 8 as illustrated in FIG. 9. The blow molded drum has a cylindrical side wall 201 and a generally planar top wall 202, these being connected at selected portions of the corner by a modified corner configuration 203. This corner configuration is heat sealed to the base 211 of preformed plastic insert 210 which presents a pair of indentations 214 and 215 on opposite sides of ridge 216. These indentations are engaged by the jaws 111 and 112 of the "parrot's beak" mechanism, there being a vertical lifting force $F_1$ applied by jaw 112 to the lower side of ridge 216 and a lateral force $F_2$ applied to the other side of ridge 216 by jaw 111. In addition to the forces $F_1$ and $F_2$ which are applied to insert 210 by jaws 111 and 112, the jaw mechanism (not shown) operates to increase the gripping forces (analogous to the forces $F_X$ and $F_Y$ applied in the prior embodiment of FIG. 6) as the vertical force $F_1$ increases, thus increasing the gripping force as the weight of the drum increases. It will be noted that these gripping forces, by virtue of the placement of indentations 214 and 216, will not be along the same vertical line as in the case in the embodiment of the prior art shown in FIG. 6.

When a steel drum, as illustrated in FIG. 2A or FIG. 2B, or a plastic drum with a shaped "grabbing" corner, as illustrated in FIG. 4 or FIG. 5, fails as a result of overloading, the forces applied by the jaws 111 and 112 cause a leakage opening to be formed in the wall of the drum. If, on the other hand, a drum of the present invention employing a preformed plastic insert 210 fails as a result of overloading, the plastic insert fractures, but a leakage opening does not form. Thus, the drum can continue in service; it can be re-handled at another location on the plastic insert or by engaging the other, unfractured, insert.

Figure 10:
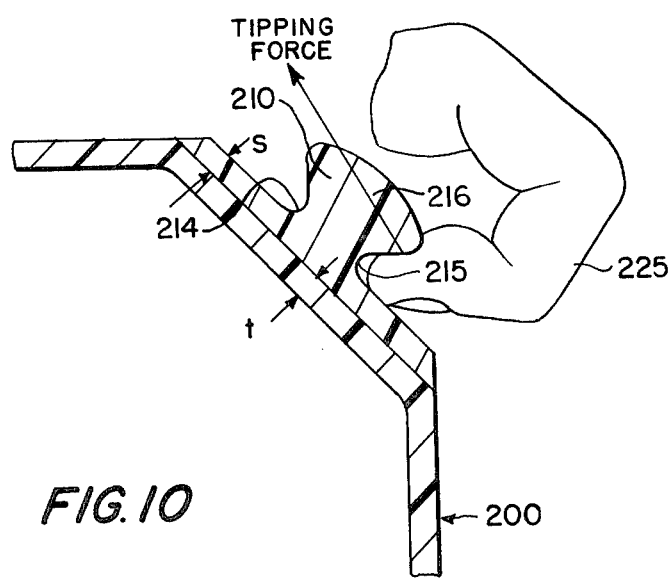
FIG. 10 is a partial schematic section view of the same embodiment shown in FIG. 9 engaged by a finger.

Although FIG. 9 illustrates the use of a drum assembly of the present invention with a "parrot's beak" drum handling mechanism, it will be observed from FIG. 10 that the indentations 214 and 215 are also useful for manual handling of the drum. Thus, in FIG. 10, a finger 225 is engaged in indentation 215 to apply a tipping force for manually tipping the drum. In actual practice, the fingers of one or two hands may be engaged in indentation 215, thus making it a simple matter to tip and roll the drum manually.

It will also be observed that the upper indentation 214 is useful with drum handling apparatus as shown at the right-hand side of FIG. 1. Thus a hook 118 engages in this upper indentation. For this purpose, it is of particular utility to dimension insert 210 to place indentation 214 no more than approximately ½ inch from the edge of the drum. Since this will require a reach of only ½ inch, any standard hand truck is useful with a drum assembly of the present invention.

As previously observed, an important advantage of the present invention is the elimination of minimum thickness problems which normally occur in the corners of blow molded drums. This is shown in FIG. 3. For example, a typical blow molded 55-gallon drum has an average thickness of approximately 0.25 inch with a minimum thickness (usually in the corner of the drum) of approximately half that value. The addition of the preformed injection molded insert of the present invention substantially increases this minimum thickness in two ways. First, the addition of a thickness s (see FIG. 10) inherent in the preformed injection molded piece is added to the normal thickness of the corner of the blow molded drum wall. Second, the tendency for the blow molded drum to thin out in a corner is substantially reduced so that the thickness t (see FIG. 10) is greater than the corresponding thickness obtained at the normal rounded corner as illustrated in FIG. 3.

Figure 11:
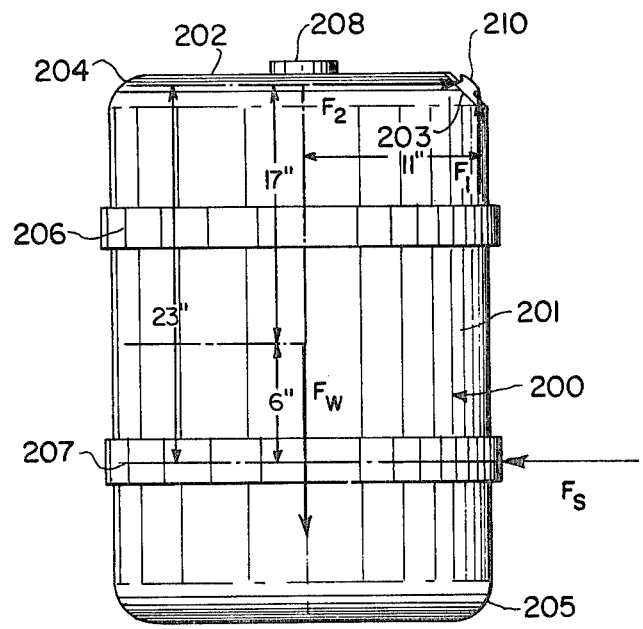
FIG. 11 is a front elevation view of the preferred drum assembly of the invention as shown in FIGS. 9 and 10.

As seen in FIG. 11, a complete drum assembly 200 of the invention includes cylindrical side wall 201 and generally flat top wall 202. An arcuate corner 204 extends between the side and top walls, and a similar arcuate corner 205 extends between the cylindrical side wall and a generally flat bottom wall. Conventional rolling hoops 206 and 207 are provided on side wall 201, and a boss 208 surrounds in opening to the drum. In accordance with teachings of the present invention, a preformed plastic insert 210 is shown fused to a modified corner configuration 203 at the top of the drum.

Drum assembly 200 will most usually be provided in the 55-gallon size. When this drum is lifted by the "parrot's beak" mechanism, it will be subjected to a number of forces. These include the force $F_W$ representing the combined weight of the drum and its contents, $F_1$ representing the lifting force provided by the lower jaw of the "parrot's beak" mechanism, $F_2$ representing the lateral force provided by the upper jaw of the "parrot's beak" mechanism against the preformed plastic insert, and $F_S$ representing a force acting on the side of the drum. $F_W$ will, in a typical application, be about 500 lbs. Since $F_1$ overcomes the weight of the drum and its contents, $F_1$ will be equal to $F_W$, which, as previously stated, will be approximately equal to 500 lbs. in a typical application. The summation of vertical forces $\Sigma F_Y$ will, therefore, be equal to 0 ($F_1 - F_W = 0$). As indicated in FIG. 11, lateral force line $F_2$ is approximately 23 inches above the center of rolling hoop 207 corresponding to the location of force $F_S$. The center of drum assembly 200 is 6 inches above the center of rolling hoop 207 and force $F_S$ and 17 inches below the location of force $F_2$. Moreover, vertical lifting force $F_1$ is applied to a point which is 11 inches from the vertical axis of the drum. By virtue of the moment arms created by the forces at the distances indicated, it follows that $F_S$ will be equal to $11/23\, F_1$. Thus, when $F_1$ is equal to about 500 lbs., $F_S$ will be equal to approximately 240 lbs. The sum of the moments operating on the drum assembly, $\Sigma$ moments, will be equal to 0, since 23 $F_S$ will be equal to 11 $F_1$. $F_2$ counterbalances $F_S$; thus $F_2$ will be equal to $F_S$ (which, as indicated above, is equal approximately to 240 lbs.). The sum of lateral forces $\Sigma F_X$ will be equal to 0, since $F_2 - F_S$ will be equal to 0.

Figure 12A:
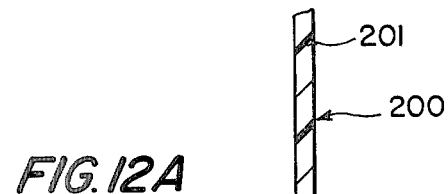
FIG. 12A is a partial schematic section view of a corner reinforcement assembly of the invention.
Figure 12B:
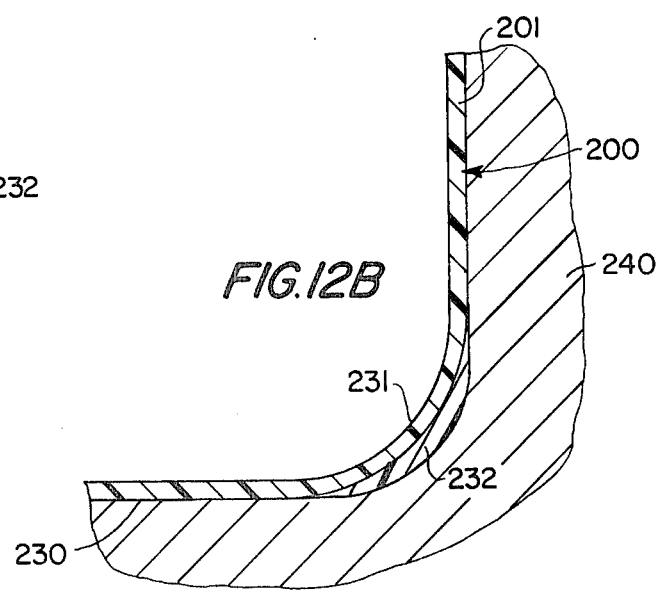
FIG. 12B is a partial schematic section view illustrating a method of making the corner reinforcement assembly of FIG. 12A.

As indicated above with reference to FIG. 3, there is a tendency of the corners of a blow molded plastic drum to thin out. It is therefore desirable to stiffen the corners of the drum so as to permit rolling of the drum without crushing. The increase in stiffness is achieved, as shown in FIG. 12A, by the addition of a pair of preformed plastic reinforcements 232 to the lower corner 231 of a blow molded drum 200, extending between the side wall 201 and the bottom wall 230 of the drum. Like preformed inserts 210, preformed inserts 232, which may be injection molded of high density polyethylene plastic, are arcuate, each occupying approximately 85° at each side of the bottom of the drum. Preferably, the inserts 210 are centered at 90° from the parting line, which extends across a diameter of the drum and corresponds to the edges of the mold halves. The corner of the blow molded drum is normally thinnest, and thus in the greatest need for reinforcement, at this point, because the greatest percentage of "draw" occurs at the corner at this angular distance from the parting line. This problem is usually dealt with by "programming" the parison (the extended tube of molten plastic from which the drum is formed) by thickening the ends of the parison in order to locate more material at the otherwise thin portions of the corner. This, unfortunately, also locates an excess of material in adjacent areas which are already too thick. The need for programming the parison is minimized, or even eliminated, by using preformed arcuate inserts 232 according to the invention. The portion of the insert is thickest near the transverse center of the corner and at the upper and lower edges is thinnest. Since the arcuate ceter of the insert is coincident with the point (90° from the parting line) which is thinnest, the insert is designed so that it is thickest at its arcuate center and thinnest at its ends. The insert may be formed in a properly designed injection mold or by vacuum forming a constant thickness plastic sheet onto a male mold. The method of fusing preformed plastic reinforcement 232 to the plastic corner 231 is illustrated in FIG. 12B. The mold 240 has a mold cavity shaped to form the conventional blow molded plastic drum. Preformed reinforcement insert 232 is shaped to fit within the corner of the mold cavity. When the plastic drum 200 is blow molded into the mold cavity it will conform to the walls of the mold cavity and to the exposed surface of preformed reinforcement insert 232 to which it will become fused. As before, it is desirable to preheat preformed reinforcement insert 232 to enhance the fusion between insert 232 and the corner 231 of the blow molded drum. By providing preformed reinforcement insert 232, it is relatively easy to achieve the minimum thickness in the corner required by certain regulations, without providing an excess of thickness in those parts of the drum where the additional thickness contributes nothing functional to drum performance.

Figure 13:
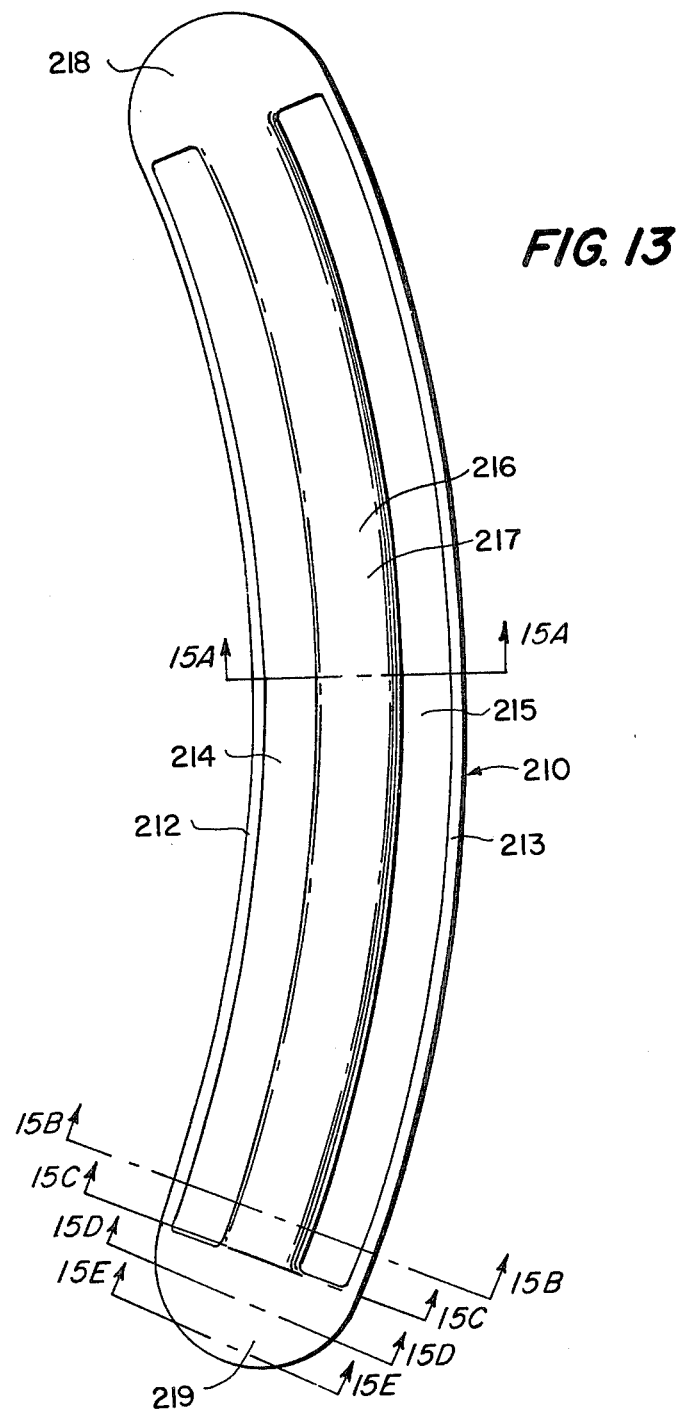
FIG. 13 is a plan view of a preferred embodiment of an insert of the invention.
Figure 14:
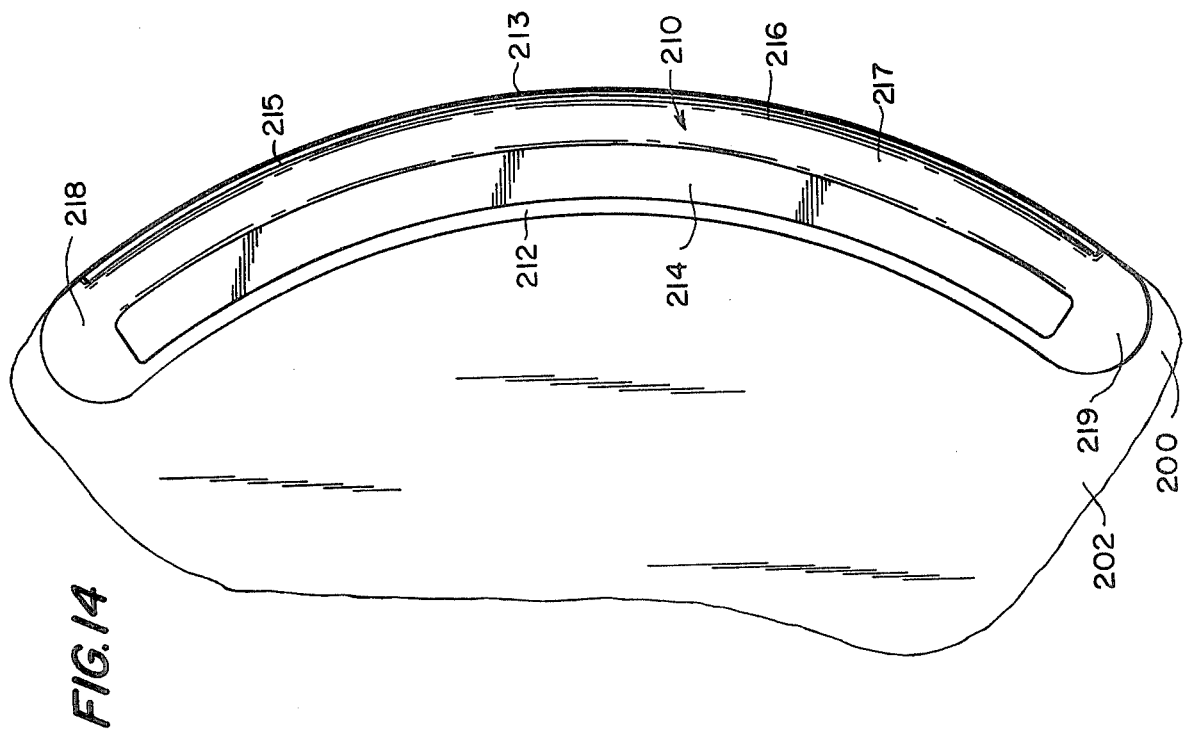
FIG. 14 is a partial plan view of a drum assembly of the invention employing the insert of FIG. 13.

Preformed plastic insert 210 will now be considered in more detail. This insert is shown in plan view in FIG. 13 and is shown in a top plan view of a drum assembly fused to the drum in FIG. 14. A number of section views of the insert are found in FIGS. 15A, 15B, 15C, 15D, and 15E. As is most readily apparent from FIGS. 13 and 14, insert 210 is arcuate, having the same radius of curvature along side edge 213 as the drum to which it will be fused. The insert extends only partially about the periphery of the drum and, in a typical embodiment, each of two inserts fused to the drum at opposite sides thereof will cover 85° of arc. As is apparent from FIG. 15A, the insert includes side edges 212 and 213 which are angled to be flush with the upper and side walls, respectively, of the drum. A ridge 216 protrudes from the center of the base and terminates in a convex crown 217. A pair of indentations 214 and 215 lie on opposite sides of ridge 216. These indentations and ridge 216 extend for most of the length of insert 210, but the ends of the insert are formed with uninterrupted curved surfaces 218 and 219. Turning, specifically, to the section views, it will be noted from FIG. 15A, which represents the cross section of the insert over most of its length, that indentations 214 and 215 undercut ridge 216. The crown 217 is convex, generally following the shape of the usual corner configuration 242 of the drum. Crown 217 is spaced slightly inwardly from the usual corner configuration 242. In a typical practical exaple, the radius of curvature of the curved portion of the usual corner configuration 242 is 1.02 inch, while the radius of curvature of crown 217 is 1.0 inch to provide a clearance between crown 217 and the corner of the mold of the order of 0.01-0.02 inch. As was noted above, however, it is also possible to dimension crown 217 so as to fit within and engage the corner of the mold. The base 211 of the insert has a surface which appears generally flat in cross section on the bottom side of the insert opposite to the side from which ridge 216 protrudes. As the ends of the insert are approached, the bottom side of the insert moves progressively closer to the normal corner configuration 242. Ridge 216 and indentation 215 disappear at the point reached in FIG. 15C; and indentation 14 disappears at the point reached in FIG. 15D. The surface of insert 210 becomes curved surface 219 (or 218 at the other end), and the insert continues to diminish in thickness as shown in FIG. 15E.

Figure 15A:
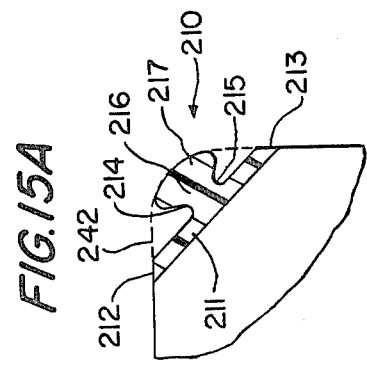
FIG. 15A is a schematic section view taken along line 15A—15A of FIG. 13.
Figure 15E:
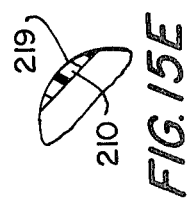
FIG. 15E is a schematic section view taken along line 15E—15E of FIG. 13.
Figure 15B:
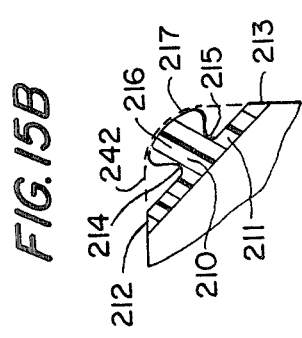
FIG. 15B is a schematic section view taken along line 15B—15B of FIG. 13.
Figure 15C:
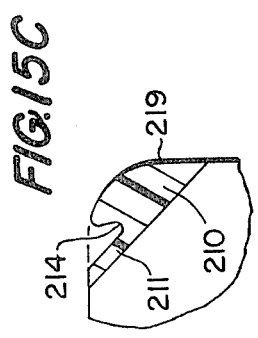
FIG. 15C is a schematic section view taken along line 15C—15C of FIG. 13.
Figure 15D:
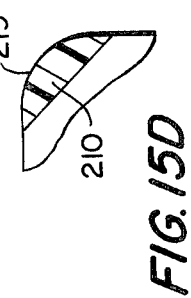
FIG. 15D is a schematic section view taken along line 15D—15D of FIG. 13.

As viewed in FIG. 15A, a typical practical embodiment will be 1⅛ inch in width and height between the acute corners of base 211. Base 211 will be 0.15 inch thick. Ridge 216 will have a height to the center of crown 217 of 23/32 inch. As viewed in FIG. 14 installed on the drum, the inner corner of edge 212 has a radius of 10.0 inches, and the outer edge of the insert at edge 213 has a radius of 11.625 inches.

A second preferred embodiment of preformed plastic insert is shown at 310 in FIGS. 16 and 17, depicting the insert respectively in plan view and in plan view as installed on a drum 200. The preformed plastic insert 310, which again is injection molded of high density polyethylen plastic, includes a base 311 having a bottom surface which is relatively flat as seen in section and edges 312 and 313 which, respectively, are placed flush in the mold to engage an end wall of the mold cavity and a side wall of the mold cavity so that these edges are flush with the top wall of the drum assembly and the cylindrical side wall of the drum assembly. A ridge 316 extends from the top side of base 311. A first indentation 314 undercuts one side of ridge 316; a second indentation 315 on the opposite side of ridge 316 undercuts the other isde thereof.

In practising the method of the present invention, the preformed plastic insert is preheated throughout the part before it is placed in the mold. This is desirable because there is inevitably some warpage in the preformed insert; and it is, thus, difficult to obtain good conformation between the preformed plastic insert and the walls of the mold cavity. This problem is overcome by preheating throughout the part, since, in that event, a warped preformed injection molded part is less rigid and thus will conform to the mold under pressure. Thus, the preheating offers a synergistic effect by allowing the slightly distorted injection molded insert to conform to the contour of the blow mold and, at the same time, to achieve a temperature (210°-240° F.) sufficient to insure good fusion and bond with the blow molded plastic which is pressed against the insert by blow mold pressure. An additional advantage of the preheating of the insert prior to its placement in the blow mold is the ability of the insert to conform to a mold of somewhat greater or smaller body radius.

When the insert 210 is preformed in an injection molding process, the plastic material is injected into a metal mold at an elevated temperature and held under pressure. As the cold metal of the mold chills the insert during the cooling process, the "skin" of the insert freezes while the interior of the insert is still in a hot viscous state. Thus, as the rounded skin at 217 freezes and hardens, the inside material cools less rapidly and is still soft. As the inside slowly cools, it shrinks. However, the rounded surface, as it freezes, is rigid and thus cannot shrink inwardly. For this reason, the shrinkage of the inside material will tend to form vacuum voids which may constitute weak spots. This can be avoided by providing a flat crown, or even an inward depression, for the ridge. Although frozen and rigid, the flat surface or an inward depression can bend inwardly as the inside material cools and shrinks, thus avoiding the formation of voids. Thus, in the embodiment of FIGS. 16, 17, and 18A, a flat crown 317 is provided on ridge 316 of insert 310.

It will be readily apparent that when the embodiment of FIG. 14 is placed out-of doors in the rain there will be a tendency for water to collect in pper indentation 214. This can be a nuisance when the drum is tipped as it is handled. This problem is substantially avoided by the embodiment of FIGS. 16 and 17. The ends of insert 310 are configued so as to permit water collecting in indentation 314 to drain as indicated by the arrows in FIGS. 16 and 17. This is made possible by providing a transition section 319 between the ends of the insert 320 and the protruding ridge 316. There is also a transition between indentation 315 and end cavities 321 through raised ribs 318.

The configuration of insert 310 for these purposes will be best understood by consideration of the various section views. Turning first to FIG. 18A, it will be noted that the normal corner configuration of the drum is indicated in phantom line at 300. Protruding ridge 316 extends just short of this configuration and, as was discussed above, presents a flat crown 317 to the corner. The side edges 312 and 313 of the base 311 are flush, respectively, with the top and side walls of the drum. FIG. 18B shows the transition from the normal configuration of FIG. 18A to the end configuration of the insert. Here, indentation 315 has evolved into a lateral rib 318, while indentation 314 continues. In FIG. 18C, the bottom of insert 310 begins to approach line 300; ridge section 319 separates indentation 314 from end cavity 321. In FIG. 18D, the height of the ridge section 319 diminishes, while indentation 314 and cavity 321 are maintained. In FIG. 18E, ridge section 319 is much smaller, as indentation 314 and cavity 321 become much shallower. Finally, in FIG. 18F, a relatively thin end structure 320 is shown. Since end structure 320 and ridge section 319 do not wall off the ends of the upper indentation to the same extent as the ends of insert 210, water does not accumulate therein, but tends to drain over ridge section 319 as indicated by the arrows in FIGS. 16 and 17.

The dimensions of insert 310 are generally the same as the dimensions of insert 210. Again, 85° of arc define the length of arcuate insert 310. The inner edge 312 is on a radius of curvature of 10.0 inches, and the outer edge 313 is on a radius of curvature of 11.625 inches. The height and width of the insert as seen in FIG. 18A is $1\frac{1}{8}$ inch. Ridge 316 fits within the usual corner configuration 300 which, as before, has a radius of 1.02 inches. The width of ridge 316 at its base is approximately $\frac{3}{8}$ inch. The length of insert 310 as viewed in FIG. 16 is $14\frac{1}{4}$ inches, and its arcuate length is approximately $15\frac{1}{4}$ inches.

The drum assembly embodiments discussed above are closed drums in which the top wall of the drum is integral with the side walls thereof. It is also possible to apply the principles of the present invention to an open ended drum. This is illustrated in FIG. 19, where drum assembly 400 includes a cylindrical side wall 401, and an upper corner 402 upon which a preformed plastic insert 410 is surmounted. Unlike the preformed inserts 210 and 310, discussed hereinabove, preformed insert 410, which is also injection molded of high density polyethylene, is annular and extends completely about the periphery of the drum. Insert 410 includes a base 411 having edges 412 and 413 which are angled to fit flush with the corresponding walls of the mold cavity so as to seal off a corner of the mold. A pair of indentations 414 and 415 are provided on opposite sides of a ridge 416 protruding from one side of base 411. Ridge 416 terminates in a flat crown 417.

In forming drum assembly 400, preformed insert 410 is placed in the top corner of a conventional plastic drum mold cavity with edges 412 and 413 sealing off the corner of the mold. As already explained, insert 410 is annular and, thus, extends completely around the corner of the mold cavity. Crown 417 will be spaced inwardly from the corner. The plastic parison is the introduced into the mold cavity and blow molded to engage the side and end walls of the cavity and to form corner 402 which conforms to the shape of the bottom side of base 411 of insert 410. As before, insert 410 is preheated throughout the part before it is placed in the mold and, therefore, a good fusion is obtained between corner 402 and the base 411 of the insert. As indicated in phantom line, a top wall 403 is also formed. This wall, however, is removed by cutting on a radius R along cutline 420 to provide the top opening in the drum.

A lid 421 which may be molded from plastic or formed from steel is then provided. This lid includes an annular recess 422 the outer side of which engages against the cut edge of corner 402. It is formed with an annular ridge 423 extending over edge 412 of the insert and is then provided with an annular recess 424 which is engaged in indentation 414 of insert 410. The lid has another ridge 425 which extends over the upper corner of ridge 416 and a generally flat annular surface 426 extending over flat crown 417. Finally, the outer periphery of lid 421 includes a bent portion 427 extending over the lower corner of ridge 416. It will be observed that a rubber gasket 430 is provided between the upper corner of ridge 416 and the inside of ridge 425 of lid 421. In order to maintain lid 421 on the drum assembly, a locking ring 432 is provided. This locking ring includes an upper arm 433 which engages against ridge 425 of the lid and a lower arm 434 which is received in indentation 415 of preformed insert 410. As will be observed from FIG. 19, a "parrot's beak" mechanism may become engaged with drum assembly 400 with upper jaw 111 being received in annular recess 424 of lid 421 and lower jaw 112 being received against lower arm 434 of locking ring 432 in recess 415. By applying lateral and vertical forces as previously explained, the "parrot's beak" mechanism will then operate to lift drum assembly 400 which is filled as indicated at 405.

Although FIG. 19 illustrates the use of a "parrot's beak" mechanism with drum assembly 400 with lid 421 applied, it is to be understood that the "parrot's beak" mechanism may also be used with an open drum with lid 421 removed. In that case the jaws 111 and 112 of the "parrot's beak" mechanism will become engaged, respectively, in indentations 414 and 415 of insert 410.

The embodiment of FIG. 19 has substantial advantages over prior art open headed plastic drum designs. These prior art designs include blow molded chimes which tend to become distorted when drums are stacked. This causes the gasket to leak. In addition, there is a tendency for the top opening to ovalize. The embodiment of FIG. 19 avoids these problems, because performed insert 410 adds rigidity without making the upper part of the drum especially heavy.

As was explained above, the method of joining the preformed plastic insert to the drum includes the step of preheating the insert throughout the part before it is placed in the mold; this insures that the insert, which may be warped, will fit snugly across the corner of the mold and also insures that there will be a good heat seal between the modified corner of the drum and the facing surface of the base of the insert. Referring to FIG. 20, it will be seen that a preheated insert 210 is placed in the lower corner 223 of mold 220. This illustrates the usual practice of blow molding the closed head drum upside down. By molding the drum upside down, the need to provide means in the corner of the mold to retain the prewarmed insert during the blow molding step is avoided. Gravity holds the preformed insert in place. It may, therefore, be placed simply in the mold by hand. The figure otherwise corresponds to FIG. 8. Insert 210 is preheated to a temperature in the range 210°–240° F., which is usually just under the melting point of the thermoplastic used to form the insert. This provides good heat seal bonding with the blow molded material 203 of the corner of the drum which hits the inside surface of the insert and fuses thereto under the pressure of blow molding. The pressure of the blow molding will force the softened insert to conform snugly with the corner of the mold. It should be borne in mind that the step, according to the present invention, of preheating the insert throughout the part to provide flexibility for good conformity to the corner of the mold differs significantly from the prior art practice of heating an insert at the contact surface only while leaving the remainder relatively cool.

Figure 20A:
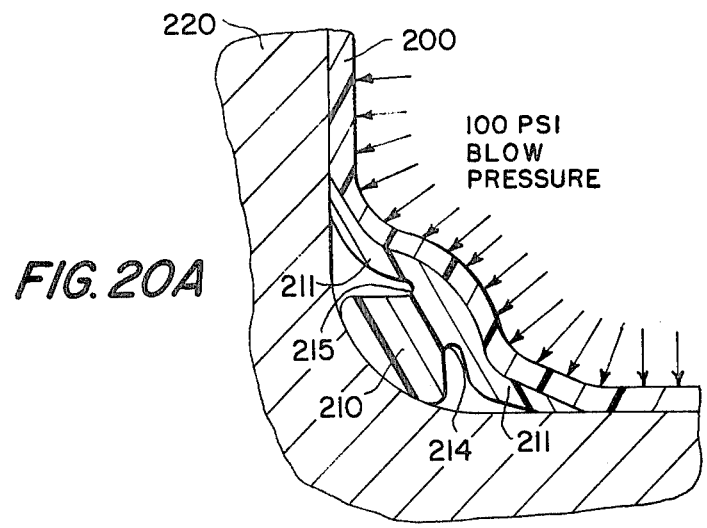
FIG. 20A is a partial schematic section view corresponding to FIG. 20 illustrating a problem faced in the method of FIG. 20.
Figure 21:
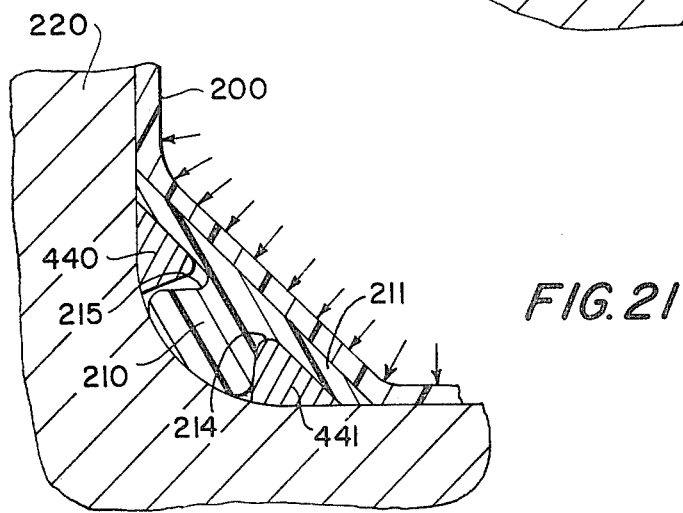
FIG. 21 is a partial schematic section view illustrating a modified method step of the invention.

One problem with a preheated insert, which is heated throughout the part, is the tendency of the insert, in the event that it is oversoftened, to deform under blow molding pressure. This is illustrated in FIG. 20A where a typical blow molding pressure of 100 lbs. per sq. in. is applied and is shown deforming the portions of base 211 which border on indentations 214 and 215. This tendency to deform the insert can be avoided in the manner shown in FIG. 21. A metal support member 440 may be attached to the side wall of mold 220 so as to receive indentation 215. A second metal support member 441 is shaped to snap into indentation 214 before it is placed within the mold. Thus, a preheated insert 210 with support member 441 snapped into indentation 214 is placed in the corner of the mold by fitting indentation 215 over support member 440. When blow molding pressure is now applied, base 211 will be firmly supported by support members 440 and 441 and will not deform. It also is possible to fasten both support members to the mold. In that event, however, it is necessary to shorten and round off the apex of the support member extending into the indentation 214 or 215 to permit removal of the finished drum from the mold without "hanging up" on support members 440 and 441. Even though these members will be abbreviated and not in full contact with the surface of the respective indentation of the insert, enough support will be provided to prevent collapse of the base 211 of the insert under pressure. Another variation involves leaving both support members unattached to the mold. For this, support member 440 should assume the same configuration as support member 441. Both support members would be snapped into the respective indentation 214 or 215 before the inset is placed in the mold, and both support members would be removed with the drum after forming.

Figure 22:
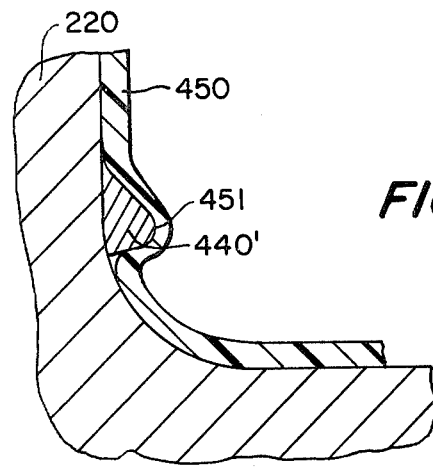
FIG. 22 is a partial schematic section view illustrating another embodiment of the method of the invention.
Figure 22A:
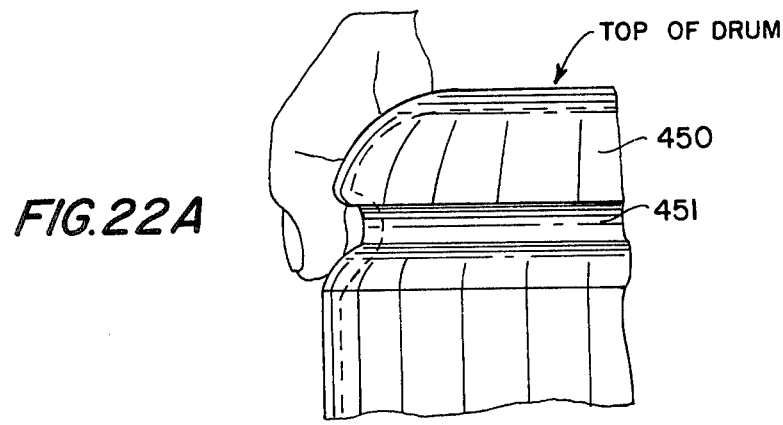
FIG. 22A is a partial elevation view showing the structure of a drum made by the method of FIG. 22.

As shown in FIG. 22, it has been found that a support member 440', the apex of which is rounded off, may be used alone to shape a blow molded drum. Thus, a blow molded drum 450 is formed in mold 220 with an indentation 451 formed adjacent the corner of the drum by support member 440'. A drum made in accordance with the method illustrated in FIG. 22 is shown in FIG. 22A. A finger receiving recess 451 is provided just below the corner of drum 450 and is useful for manually handling the drum.

Figure 23:
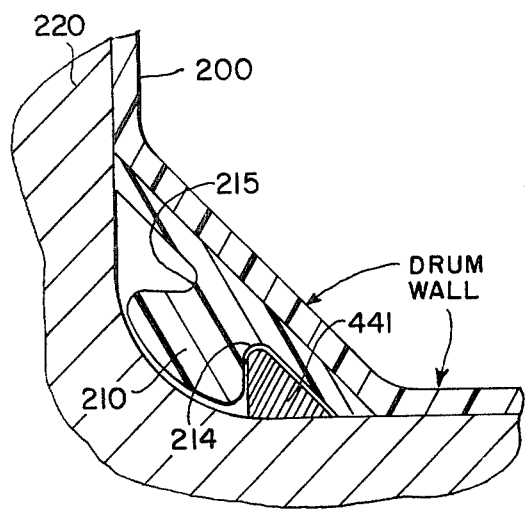
FIG. 23 is a partial schematic section view illustrating a further modification of the method of FIG. 20.

It is also possible to employ one support member only in the forming of a drum assembly. This is shown in FIG. 23 where metal support member 441 is snapped into recess 214 before it is placed in the mold corner. Although support member 440 has been omitted, it has been found that, in some cases, support member 441 is sufficient to provide the necessary support for the insert as the drum is molded.

Figure 24:
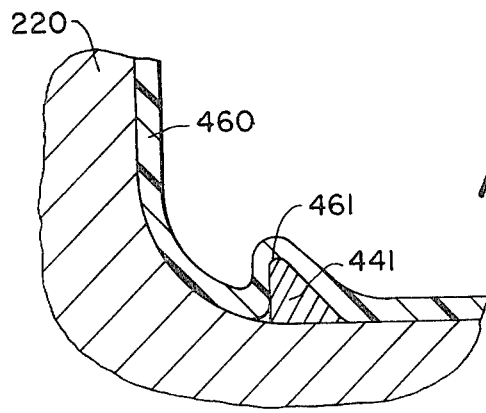
FIG. 24 is a partial schematic section view illustrating yet another method of the invention.
Figure 24A:
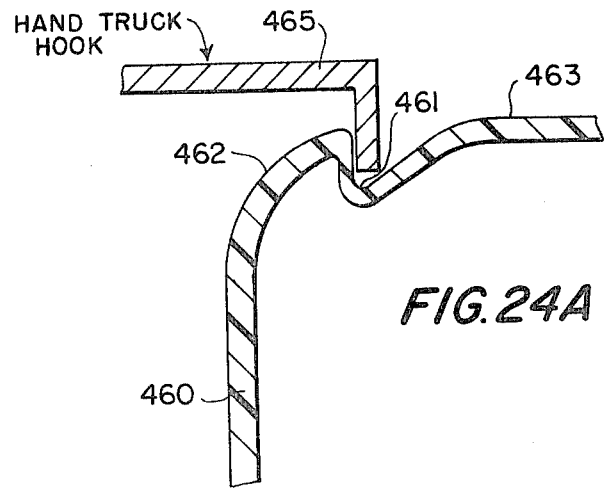
FIG. 24A is a partial schematic section view of a drum made by the method of FIG. 24.

As shown in FIG. 24, a drum may be shaped by employing support member 441 only. The support member is attached to an end wall of the mold cavity. Drum 460 is then blow molded with support member 441 forming recess 461. The shrinkage of the drum wall in the vertical direction has been found to be sufficient to clear the indentation 461 from the support member 441 so that the finished drum can be removed from the mold without interference. The drum 460 made by the method of FIG. 24 is shown in FIG. 24A. The recess 461 is positioned between the top wall 463 of drum 460 and the usual curved corner 462. This recess 461 is useful for engagement by the hook 465 of a hand truck.

As shown in FIG. 25, a pair of recesses may be provided in a blow molded drum by employing both support member 440 and support member 441. Support member 440 is secured to the side wall of mold 220, while support member 441 is secured to a moveable mold section 220' in the end wall thereof. Plastic drum 470 is then blow molded into the mold cavity. Support member 440 will then form recess 471, and support member 441 will form recess 472 on opposite sides of the arcuate corner 473 of the drum. In order to remove the formed drum from the mold, one side of mold 220 must be moved laterally away from the drum. Since support member 441 would block such separation of the mold from the drum, it is necessary first to retract support member 441. To this end, mold section 220' is retracted by the actuation, for example, of a hydraulic piston (not shown) to move support member 441 completely below the end wall of mold 220. The drum made by the method shown in FIG. 25 is illustrated in FIG. 25A. Drum 470 includes a recess 471 and a recess 472 on opposite sides of corner 473. These recesses are engaged respectively by jaws 111 and 112 of a "parrot's beak" mechanism. As will be readily apparent, the method of FIG. 25 may serve as an alternative method for forming the drum illustrated in FIG. 5. Accordingly, the spacing between indentations 471 and 472 should correspond to the rules prescribed for the spacing between indentations 154 and 156 of FIG. 5.

Although the invention has been described with reference to plastic drums having arcuate, or round, corners between the end walls and the cylindrical side wall, it will be recognized that the principles of the invention are also applicable to drums having other configurations. Preformed plastic inserts may be used, for example, with drums having square corners. In that case, portions of the square corners will be modified by the insert as the drum is blow molded. Inserts of the invention may also be applied to drums which are square or rectangular. In these cases, the preformed insert will no longer be arcuate, but rather, will be straight so as to conform with the straight walls of the drum.

As indicated above, preferred embodiments of drum assemblies according to the invention involve preformed plastic inserts which are heat sealed to a modified corner of a blow molded drum. It is to be recognized, however, that it is also broadly within the purview of the invention to secure a preformed insert to a pre-modified drum corner by other conventional securing methods and means, such as by induction welding, epoxy cement or screws.

In this specification, the term "parrot's beak" has been used to describe a mechanism of the prior art employing grabbing and lifting jaws for engaging cooperating means provided at the top rim of the drum.

As has been demonstrated, the principles of the present invention avoid the major drawbacks of prior art methods employing preformed inserts. Unlike the prior art methods, which require major modification of existing conventional blow molding molds, it is merely necessary according to the present invention to set a preformed plastic insert in the corner of the mold cavity with the peripheral edge of the insert sealing off the corner. It will be recognized that this makes it possible rapidly to changeover the use of the mold to or from the blow molding of conventional plastic drums and the blow molding of plastic drum assemblies according to the present invention.

While preferred embodiments of the invention have been shown and described, it will be apparent to those skilled in the art that changes and modifications can be made without departing from the spirit of the invention, the scope of which is defined in the following claims.

The invention claimed is:

1. A preformed insert adapted to be joined to a corner structure of a plastic drum to facilitate lifting thereof and adapted to be positioned within an arcuate corner of a conventional blow mold for forming said drum, said blow mold having an end wall, a side wall, and said arcuate corner connecting said end wall and side wall, said insert comprising: a relatively broad base, a relatively narrow ridge extending from one side of said base, and a pair of indentations respectively on opposite sides of said ridge extending lengthwise of the ridge, said base having a continuous peripheral edge and being dimensioned to fit across said arcuate corner of said mold with said ridge extending outwardly towards, and no further than, said arcuate corner and with said continuous peripheral edge of said base in continuous engagement with said mold to seal off at least a portion of said corner of said mold as plastic parison is blow molded in said mold and keep said plastic parison from entering said indentations.

2. An insert as recited in claim 1, wherein the crown of said ridge is convex.

3. An insert as recited in claim 1, wherein the crown of said ridge is flat.

4. An insert as recited in claim 1, wherein said insert is arcuate to fit partially about the periphery of said drum.

5. An insert as recited in claim 1, wherein the ends of said ridge are shaped to permit water to drain from one of said indentations.

6. An insert as recited in claim 1, wherein said insert is circular to extend entirely about the periphery of said drum.

7. An insert as recited in claim 1, wherein said base has edge surfaces contiguous with said continuous peripheral edge, said edge surfaces being adapted to engage flush with said top and side walls, respectively, of the mold.

8. An insert as recited in claim 1, wherein said insert is formed of high density polyethylene.

9. An insert as recited in claim 1, wherein the crown of said ridge is convex and has the same radius of curvature as said arcuate corner of said mold and extends outwardly to engage said arcuate corner when said insert is positioned in said mold.

10. An insert as recited in claim 1, wherein the crown of said ridge is convex and has substantially the same radius of curvature as said arcuate corner of said mold and extends outwardly just short of engagement with said arcuate corner when said insert is positioned in said mold.

* * * * *